(12) United States Patent
Davis

(10) Patent No.: US 9,457,380 B2
(45) Date of Patent: Oct. 4, 2016

(54) ROTARY SORTING APPARATUS

(71) Applicant: Nicholas Davis, San Diego, CA (US)

(72) Inventor: Nicholas Davis, San Diego, CA (US)

(73) Assignee: CP Manufacturing, Inc., San Diego, CA (US)

( * ) Notice: Subject to any disclaimer, the term of this patent is extended or adjusted under 35 U.S.C. 154(b) by 0 days.

(21) Appl. No.: 14/797,088

(22) Filed: Jul. 11, 2015

(65) Prior Publication Data

US 2016/0045936 A1 Feb. 18, 2016

Related U.S. Application Data

(60) Provisional application No. 62/037,038, filed on Aug. 13, 2014.

(51) Int. Cl.
*B07B 1/18* (2006.01)
*B07B 1/22* (2006.01)
*F16C 19/14* (2006.01)

(52) U.S. Cl.
CPC .............. *B07B 1/22* (2013.01); *F16C 19/14* (2013.01); *F16C 2300/14* (2013.01); *F16C 2310/00* (2013.01)

(58) Field of Classification Search
CPC .................................. B07B 1/22; F16C 19/00
USPC ......................................... 209/284, 287, 288
See application file for complete search history.

(56) References Cited

U.S. PATENT DOCUMENTS

| | | | | |
|---|---|---|---|---|
| 1,828,548 | A * | 10/1931 | Shapley | B04B 3/04 210/374 |
| 2,838,290 | A * | 6/1958 | Simpson | B01F 9/0007 198/736 |
| 3,679,035 | A * | 7/1972 | Schmitt | B01D 33/067 192/129 A |
| 3,837,490 | A * | 9/1974 | Driebel | B03B 5/56 134/159 |
| 7,374,049 | B2 * | 5/2008 | Douglas | B07B 1/005 209/284 |
| 2015/0176184 | A1 * | 6/2015 | Jung | D06F 37/203 8/137 |

* cited by examiner

*Primary Examiner* — Terrell Matthews
(74) *Attorney, Agent, or Firm* — Manuel de la Cerra

(57) ABSTRACT

A rotary sorting apparatus comprises a large-diameter rotary drum for sorting a mixture of materials received through a first end of the drum and expelled through a second end. A plurality of slew rings are attached circumferentially to the outer surface of the drum for supporting and rotating the drum. Each slew ring comprises an inner race placed concentrically within an outer race, with bearings between them allowing the inner race to rotate freely within the outer race. The inner surface of the inner race is attached to the outer surface of the drum and rotates with the drum, while the outer surface of the outer race is fixed to the supporting structure. A rotator, such as a wheel, in contact with the outer surface of the drum causes the drum to rotate about its longitudinal axis.

11 Claims, 4 Drawing Sheets

# ROTARY SORTING APPARATUS

RELATED APPLICATIONS

This application claim priority as the non-provisional of U.S. Patent Application Ser. No. 62/037,038 filed on Aug. 13, 2014, the contents of which are fully incorporated herein by reference.

This application is also related to U.S. Patent Application Ser. No. 62/153,901 filed on Apr. 28, 2015, converted to non-provisional application Ser. No. 14/797,090 filed on Jul. 11, 2015; U.S. Patent Application Ser. No. 62/160,219 filed on May 12, 2015; and U.S. patent application Ser. No. 14/797,093 entitled "Rotating Suction Chamber Apparatus" filed on Jul. 11, 2015; all of which are assigned to the same assignee and have a common inventor with the present application. Each of these applications is incorporated herein by reference.

TECHNICAL FIELD

The present invention relates generally to machines used to separate particulate materials or mixed recyclable materials into difference fractions, and more particularly, to a rotary drum used therein.

BACKGROUND

Rotary drums are used in a variety of applications, typically in mining and agriculture. Generally, material is provided to one end of the drum while it is rotated, then expelled out through the other end. In some cases, the rotary drum includes screens that act to separate materials by size. For example, excavation contractors may use a screened drum to separate site debris into two fractions: a saleable topsoil for farms, nurseries and site-work; and cleaned rock for aggregates or landscaping work. This allows the contractor to resell waste, instead of incurring the cost of sending it for disposal.

These rotary drums, otherwise referred to as trommels when incorporating perforated walls, generally comprise two or more steel "ride rings" forged or machined onto an outside circumference of the drum, and supported by metal or plastic casters. The ride rings are typically very heavy, adding significant weight to the overall structure. To rotate the drum, the casters are turned, either directly or indirectly, by a motor, and the casters in turn spin the drum based on a frictional force of the ride rings against the casters. A typical prior art design is shown in FIGS. 6A and B.

In mining applications, the trommel turns relatively slowly (<1 RPM) due to the nature of the material being introduced, e.g., high impact, high density material such as rock. The rotational speed of the trommel in these applications is limited due to hysteresis and friction in the mechanical components, which can cause heat buildup and damage to the casters if higher speeds are attempted.

Further, because as each ride ring turns with the drum, there is a significant amount of weight being rotated, and the inertia and dynamics of this rotating mass introduce hazards at higher rotational speeds and drum diameters.

Another issue with the traditional ride ring and caster system occurs when using rotary drum sieves (i.e. trommels). In these systems, the ratio of screening length to total length is an important measure of machine efficiency and footprint within a facility. Traditional designs achieve 60%-80% utilization of the total length, with the number dropping lower as the rotational speed of the trommel increases.

A further problem with rotary drums is that they must often be mounted at a decline in order to get material to move through the drum. This creates mechanical thrust, or axial loading, rather than radial loading. In ring and caster systems, this requires the addition of mechanical components, often thrust rollers, to take the thrust.

The drum itself may weigh up to 40 tons, and have a length of up to 80 feet. Because the entire mass is rotating, supporting this load becomes very difficult. The casters used in prior art designs are limited in the load that they may carry, which limits the distance between casters/ride rings. In other words, more ride rings and respective caster assemblies must be used, spaced closer together, when using a very large diameter drum. Further, only a 60% or less utilization ratio is typically achieved with very large diameter drums, because a large portion of the drum's length is used for carrying rather than screening. Other problems with prior art designs include ride rings that are not consistently round, and dynamic forces may cause the drum to bounce, even at very high weights.

What is therefore needed is a large-diameter rotary drum that is capable of operating at higher rotational speeds with improved utilization ratios and which also has reduced weight, cost, footprint and complexity. Using a large drum diameter solution disclosed below pushes the screen utilization ratio above 90%, reducing cost and footprint, and increasing the amount of separation which can occur in a given space.

SUMMARY

The rotary sorting apparatus disclosed herein addresses the need in the art for more efficient rotary drum. In one embodiment, the drawbacks of the prior art are avoided or minimized by the use of large-diameter, multi-race bearings, such as "slewing rings," in place of the ride ring and caster system. Using this design, an outer race of the bearing remains fixed as the drum is rotated, while an inner race rotates with the drum. This means that the majority of the weight of the mechanical system is stationary rather than rotating, reducing loads and dynamics. Further, ball or roller bearings used in the multi-race bearing are able to run at significantly higher speeds than traditional caster systems.

These multi-race bearings are used in a variety of applications, including wind turbines and large rotary cranes. The use of slew rings on rotary drums to achieve greater rotational speeds and larger drum diameters can be applied to a number of different applications, such as the recycling industry, in kilns, autoclaves, or rotary dryers.

In the waste recycling industry, a mixture of material to be sorted typically comprises a high volume, low density, low impact, and highly heterogeneous material. As such, it is advantageous to use a trommel having a very large diameter and which is capable of rotating at a much higher RPM (for example between 12 and 50 RPM) than prior art designs. In known systems using ride rings and casters, this would introduce a significant amount of heat, load, and dynamics to the system, requiring ever-larger and heavier components which would, in turn, add even more heat, load, and dynamics to the system. A 10' diameter is currently the most common as screening efficiency scales strongly with diameter, although other diameters, both larger and smaller, can be used.

The use of slew rings greatly avoids the above problems, because the total weight of the rotating drum is reduced. Thus, larger diameter drums may be used than would otherwise be possible with prior art designs. This leads to increased utilization rations, less component wear, and greater spans between slew rings.

The foregoing summary is illustrative only and is not meant to be exhaustive. Other aspects, objects, and advantages of this invention will be apparent to those of skill in the art upon reviewing the drawings, the disclosure, and the appended claims.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

DETAILED DESCRIPTION OF EXAMPLE EMBODIMENTS

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding of the present invention. Particular example embodiments of the present invention may be implemented without some or all of these features or specific details. In other instances, components well known to persons of skill in the art have not been described in detail in order not to obscure unnecessarily the present invention.

Figure 1:
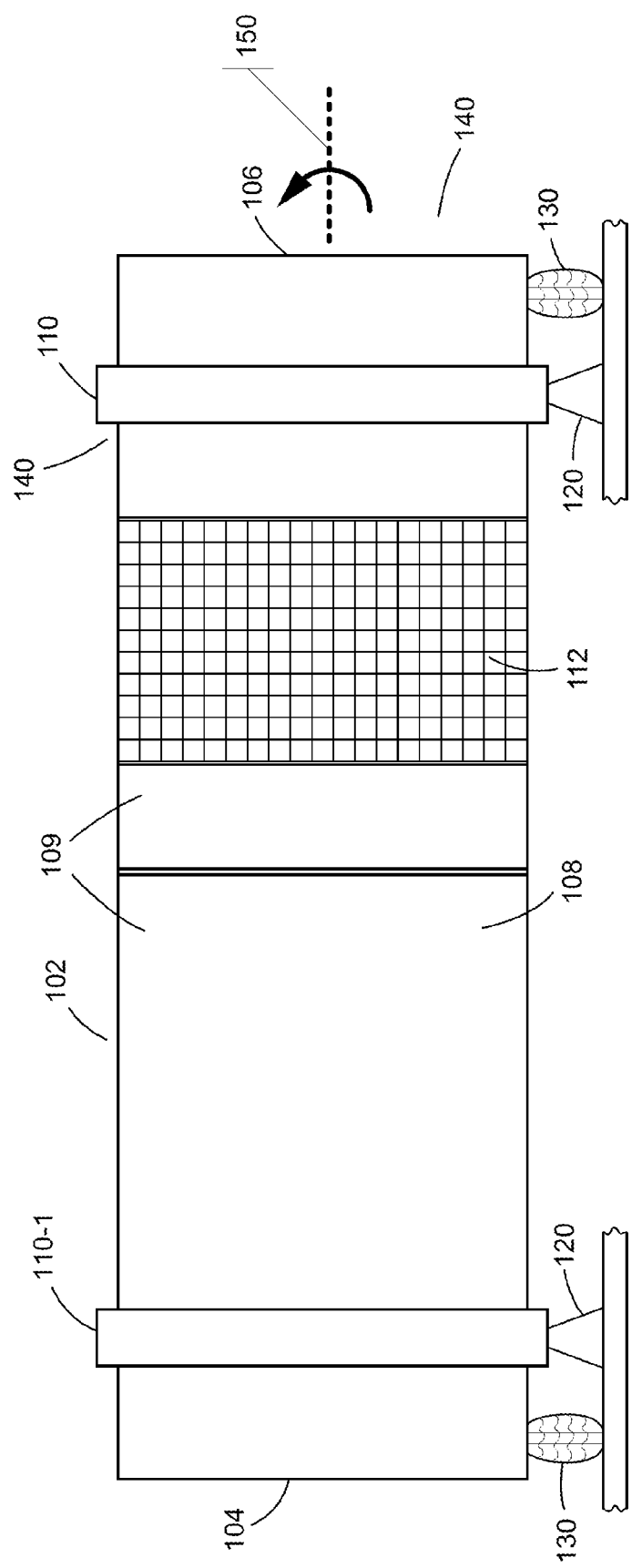
FIG. 1 is a side view of a first embodiment of the rotary sorting apparatus.

The reference numerals refer to the following structures or features of the present disclosure 102. Rotary drum
104. First end of drum
106. Second end of drum
108. Outer surface of drum
109. Drum section
110-1. Slew ring (FIG. 1)
110-2. Slew ring (FIG. 2)
110-4. Slew ring (FIG. 4)
112. Screen
120. Supporting structure
130. Wheel
140. Drum assembly
150. Longitudinal Axis
202. Inner race
204. Outer race
206-2. Ball bearings (spherical)
206-3. Roller bearings (cylindrical, conical)
208. Inner surface of inner race
210. Outer surface of outer race
302. Slanted bearing surface With reference to FIG. 1, an overall view of an embodiment of the rotary sorting apparatus is illustrated. The rotary drum assembly 140 utilizes two slew rings 110-1 to support and rotate the drum 102. In other embodiments a greater number of slew rings 110-1 could be used, depending on the expected loads due to the weight of the drum 102 and the expected material flowing through the drum 102.

The drum 102 is a hollow tube comprising metallic, plastic, or any other rigid material, and having one of any number of diameters, such as between 2 and 30 feet or more. In some embodiments, at least some portion of the drum 102 comprises a screen 112 to allow some of the material flowing through the drum 102 to fall out therethrough. The screen 112 may comprise one or more sizes to filter out different sized materials.

The drum assembly 140 can be rotated about its longitudinal axis 150 by applying a force to the external surface of the drum 102 using, for example, rubber wheels 130. As drum assembly 140 rotates, the inner race of slew ring 110 turns with drum 102 while the outer race 204 remains fixed to the supporting structure 120. To accomplish sorting, materials are introduced through the first end 104 of the drum 102. As the drum assembly 140 rotates, if one or more screens 112 are present, materials of a predetermined size may fall through and out of the drum 102. Any materials not screened out are expelled from the second end 106 of the drum 102. As described above, the rotary sorting apparatus can be operated at much higher rotational speeds than prior art designs, resulting in higher utilization rates. This novel design has reduced weight, cost, footprint and complexity.

Figure 2:
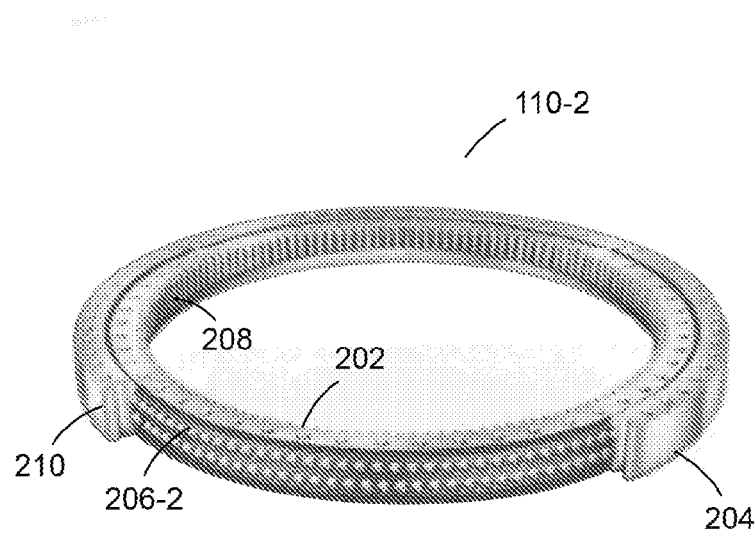
FIG. 2 is an isometric view of a first type of slew ring.

FIG. 2 illustrates a first type of slew ring 110-2 that may be used in conjunction with a drum 102, although the toothed inner race 202 may be smooth instead. The slew ring 110-2 comprises an inner race 202 placed concentrically inside an outer race 204, the two races having ball bearings 206-2 placed between them so that the inner race 202 may rotate within the outer race 204 with very little friction. The ball bearings 206-2 support a greater load-bearing capacity and can allow significantly higher rotational speeds than traditional caster systems. The slew ring 110-2 is sized such that the diameter of the inside surface 208 of the inner race 202 is approximately equal to the outside diameter of the drum 102.

Figure 3:
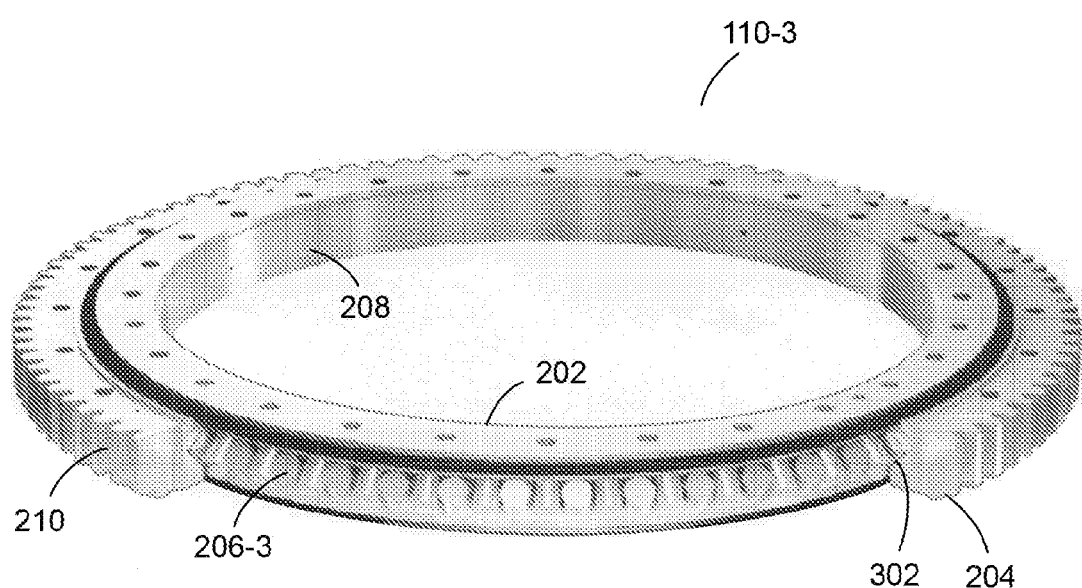
FIG. 3 is an isometric view of a second type of slew ring.

FIG. 3 illustrates a second type of slew ring 110-3 that may be used in conjunction with a drum 102, although the toothed outer race 204 may be smooth instead. In FIG. 3 the roller bearings 206-3 are cylindrical, and can also be conical, rather than spherical as illustrated in FIG. 2.

Figure 4:
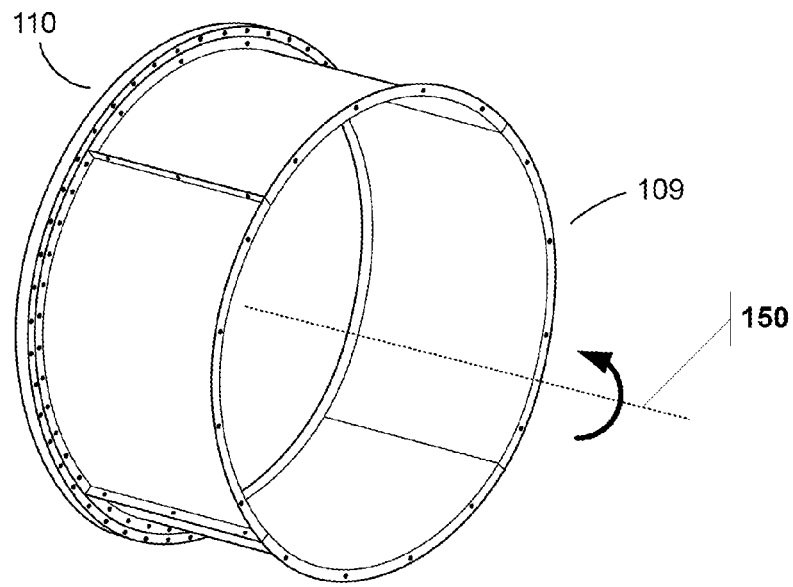
FIG. 4 is an isometric view of a slew ring attached to a drum section.

FIG. 4 illustrates a slew ring 110-4 attached to a section 109 of a drum 102, the drum 102 comprising quarter sections.

During manufacturing, at least two slew rings 110 are placed onto the outer surface 108 of the drum 102, spaced apart from one another based on the material of the drum 102, the expected weight of material as it flows through the drum 102, drum rotational speed, and/or other factors. Then, the inner race 202 of each slew ring 110 is attached to the drum 102 using conventional methods. The outer race 204 of each slew ring 110 is supported and/or attached to a respective supporting structure 120 that can bear the weight of the drum assembly 140 plus materials flowing through the drum 102.

In one embodiment, the drum assembly 140 is tilted at an angle, in order for materials introduced into one end 104 of the drum 102 to flow through the drum 102 using gravity and exit at the opposite end 106. This may be achieved by having one supporting structure 120 shorter than another supporting structure 120, in a design that uses two slew rings 110. In one embodiment, the drum assembly 140 is tilted at 10 degrees, although in other embodiments, other angles, either greater or smaller than 10 degrees, may be used. In such embodiments where tilting is desired, the slew ring 110 should be capable of supporting thrust loading. The slew ring 110-3 which has a slanted bearing surface 302, as shown in FIG. 3, could be used, to address the thrust loading.

Figure 5:
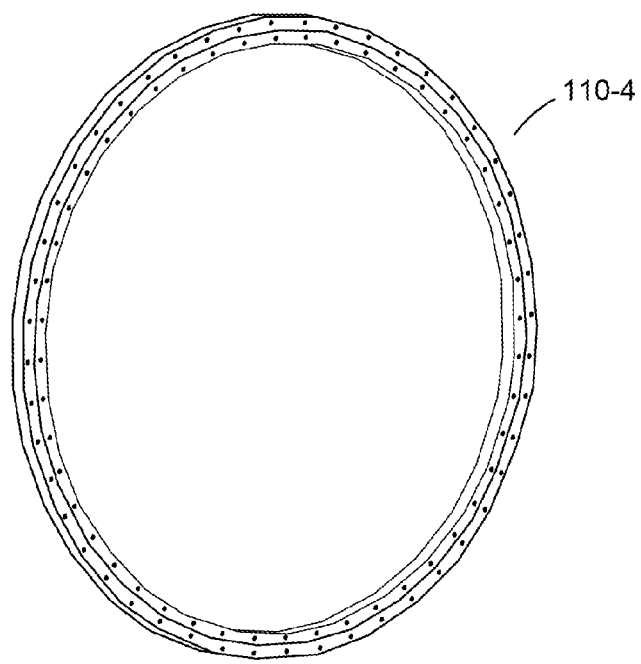
FIG. 5 is an isometric view of a third type of slew ring.
Figure 6A:
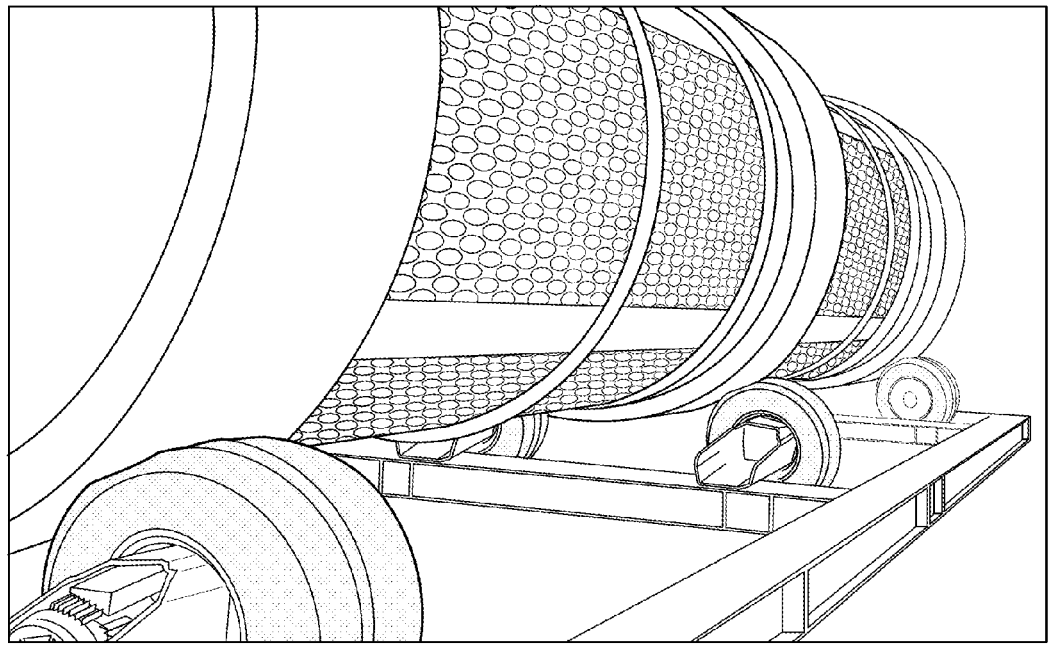
FIG. 6A is an isometric view of a prior art trommel.
Figure 6B:
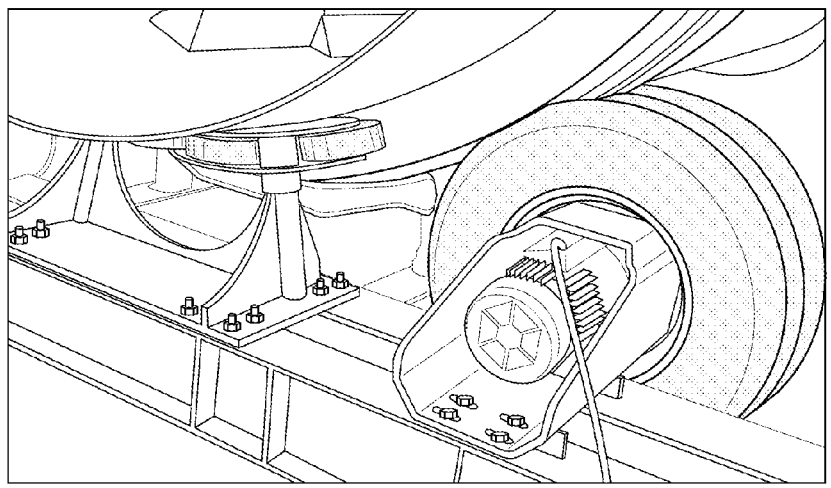
FIG. 6B is an enlarged isometric view of a prior art trommel shown in FIG. 6A.

It should be understood that any one of a variety of slew ring types may be used, and are not limited to the slew rings 110-2, 110-3 shown in FIGS. 2 and 3. For example, the slew ring 110-4 of FIG. 5, which comprises three races, could be used.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips v. AHW Corp.*, 415 F.3d 1303, 1323 (Fed. Cir. 2005) (en banc).

The invention claimed is:

1. A rotary sorting apparatus, comprising:
   a large-diameter rotary drum for sorting a mixture of materials supplied to the inside thereof, wherein the materials are received through a first end of the drum and expelled through a second end of the drum and wherein the first end of the drum is at an upward tilt relative to the second end of the drum, the drum having a longitudinal axis;
   a plurality of slew rings attached circumferentially to an outer surface of the drum for supporting and rotating the drum, wherein each of the slew rings comprises an inner race placed concentrically within an outer race, the inner race and the outer race having bearings between them, whereby the inner race is free to rotate relative to the outer race, the inner race having an outer conical surface and the outer race having an inner conical surface, the conical surfaces providing contact to the bearings to support thrust loading;
   supporting structure attached to the slew rings; and
   a rotator in contact with the outer surface of the drum adapted to rotate the drum about its longitudinal axis.

2. The sorting apparatus of claim 1, wherein the bearings comprise ball bearings.

3. The sorting apparatus of claim 1, wherein the bearings comprise roller bearings.

4. The sorting apparatus of claim 1, wherein an inner surface of the inner race has a diameter approximately equal to the diameter of the outer surface of the drum, and wherein the inner surface of the inner race is fixed to the outer surface of the drum.

5. The sorting apparatus of claim 1, wherein an outer surface of the outer race is fixed to the supporting structure.

6. The sorting apparatus of claim 1, wherein the drum comprises a rigid hollow tube.

7. The sorting apparatus of claim 6, wherein the drum further comprises a plurality of sections, at least one of the sections comprising a screen.

8. The sorting apparatus of claim 1, wherein each of the slew rings comprises three races.

9. The sorting apparatus of claim 1, wherein the rotator comprises a plurality of wheels.

10. The sorting apparatus of claim 1, wherein the rotator drives the drum above twelve (12) revolutions per minute.

11. A rotary sorting apparatus, comprising:
   a large-diameter rotary drum for sorting a mixture of materials supplied to the inside thereof, wherein the materials are received through a first end of the drum and expelled through a second end of the drum and wherein the first end of the drum is at an upward tilt relative to the second end of the drum, the drum having a longitudinal axis;
   a plurality of slew rings attached circumferentially to an outer surface of the drum for supporting and rotating the drum, wherein:
      each of the slew rings comprises an inner race placed concentrically within an outer race, the inner race and the outer race having bearings between them, whereby the inner race is free to rotate within the outer race, the inner race having an outer conical surface and the outer race having an inner conical surface, the conical surfaces providing contact to the bearings to support thrust loading;
      an inner surface of the inner race has a diameter approximately equal to the diameter of the outer surface of the drum; and
      the inner surface of the inner race is fixed to the outer surface of the drum;
   a supporting structure attached to an outer surface of the outer race of the slew rings; and
   a rotator in contact with the outer surface of the drum adapted to rotate the drum about its longitudinal axis.

* * * * *